US005517271A

United States Patent [19]

Yamaguchi et al.

[11] Patent Number: 5,517,271
[45] Date of Patent: May 14, 1996

[54] OPERATION-CONDITION DISPLAY SYSTEM FOR A PHOTOGRAPHIC PROCESSING SYSTEM

[75] Inventors: Takuji Yamaguchi; Shouichi Nakano; Noboru Michiue, all of Wakayama, Japan

[73] Assignee: Noritsu Koki Co., Ltd., Wakayama, Japan

[21] Appl. No.: 310,181

[22] Filed: Sep. 21, 1994

[30] Foreign Application Priority Data

Sep. 24, 1993 [JP] Japan .................................. 5-237095

[51] Int. Cl.⁶ .................................................. G03D 13/00
[52] U.S. Cl. ........................... 354/298; 354/319; 355/77
[58] Field of Search ............................ 355/27–29, 77, 355/68, 203–209, 38; 354/298, 324, 299, 322, 323; 134/64 P, 64 R, 122 P, 122 R

[56] References Cited

U.S. PATENT DOCUMENTS 3,462,221  8/1969  Tajima et al. ............................. 355/27
4,364,655  12/1982  Parker ..................................... 354/299
5,027,154  6/1991  Ujiie et al. .............................. 355/205
5,083,154  8/1992  Terashita et al. ....................... 355/68 X

FOREIGN PATENT DOCUMENTS 0443443  8/1991  European Pat. Off. .

Primary Examiner—D. Rutledge
Attorney, Agent, or Firm—Townsend and Townsend and Crew

[57] ABSTRACT

An operations condition display system for use in a photographic processing system is disclosed. The display system includes a first communication component provided in an automatic film developing device for transmitting information concerning an operation condition of the film developing device, a second communication component provided in a photographic printing device for receiving the information from the first communication component, and a display component provided in the photographic printing device for displaying the information received by the second communication component.

13 Claims, 6 Drawing Sheets

```
* Temperature *
CD  38.1  STB 37.8
BL  38.0  STB 38.0
FIX 37.9  STB 38.0
FIX 38.0  DRY 55.0
```

OPERATION-CONDITION DISPLAY SYSTEM FOR A PHOTOGRAPHIC PROCESSING SYSTEM

BACKGROUND OF THE INVENTION

1. Field of the Invention

The present invention relates to an operation-condition display system for a photographic processing system, and more particularly to an operation-condition display system for use in such a photographic processing system as includes an automatic film developing device for developing an exposed photographic film and a printing device for printing an image of the developed film on a photosensitive material such as a print paper.

2. Description of the Related Art

Conventionally, the automatic film developing device includes a display means which is operable to display operation conditions of the automatic film developing device.

The display means displays such information as concerning which processing step the film is presently experiencing, or concerning a temperature and an amount of developing liquid in use.

In use, an operator of this automatic film developing device appropriately judges and confirms, through the display means of the automatic film developing device, whether a new film developing process is possible or not or whether any abnormality has developed in the temperature or amount of the developing liquid or not. Then, depending on the necessity, the operator effects a film exchange or some other maintenance operation.

On the other hand, the photographic processing system of the above-described type is to be normally operated by a single operator. And, for setting of particular printing conditions with respect to the print paper in use, the operator usually has to devote most of his/her operation time for the photographic processing to the operations of the printing device.

Accordingly, when necessary, the operator has to interrupt the operation of the printing device and then to move to the location where the automatic film developing device is installed, so as to check the operation condition displayed on the display means of this automatic film developing device.

With the conventional system construction, even if the automatic film developing device is installed in the vicinity of the printing device, the operator has to interrupt the operation of the printing device and then to move to the location of the developing device for the sole purpose of checking the operation condition of the developing device, rather than actually operating this automatic film developing device. Accordingly, the operation efficiency of the photographic processing is deteriorated.

Moreover, in many actual situations, it is impossible to reserve a good amount of inter-installing space between these devices, so that the automatic film developing device and the printing device are necessarily disposed rather distantly from each other. Then, in such case, the above-described inconvenience becomes more obvious.

The present invention attends to the above-described state of the art and its primary object is to improve the operation efficiency of the photographic processing system.

SUMMARY OF THE INVENTION

For accomplishing the above-noted object, an operation-condition display system of a photographic processing system, according to the present invention, comprises:

first communication means provided in an automatic film developing device for transmitting information concerning an operation condition of the film developing device;

second communication means provided in a photographic printing device for receiving the information from the first communication means; and display means provided in the photographic printing device for displaying the information received by the second communication means.

According to this construction, the information concerning the operation condition of the automatic film developing device is transmitted from the first communication means of the automatic film developing device to the second communication means of the photographic printing device and then displayed by the display means provided in the same printing device.

Hence, an operator may check the operation condition of the automatic film developing device by seeing the information displayed on the display means, while continuing the operation of the photographic printing device. So that, the operator does not have to frequent the automatic film developing device to merely check its operation condition and he/she may effect such operation as a film exchange operation or some maintenance operation on the automatic film developing device at an appropriate timing. Consequently, it becomes possible to improve the operation efficiency of the photographic processing system.

According to one aspect of the present invention, the display means is disposed adjacent to a control unit of the photographic printing device.

The above construction allows the operator to effect the checking operation of the operation condition of the automatic film developing device while continuously operating the control unit of the photographic printing device.

More particularly, according to the above-described construction, while the operator continuously operates the control unit of the photographic printing device, he/she may check the operation condition of the automatic film developing device through the display means disposed adjacent to the control unit. Hence, the photographic processing system with this additional feature will be even more convenient.

According to a further aspect of the present invention, the display means is capable of graphic image display.

With this construction, the display means provided to the photographic printing device is capable of graphic image display, so that the operation condition of the automatic film developing device may be displayed as a graphic image.

With this capability of displaying an operation condition of the automatic film developing device as a graphic image, the photographic processing system will be even more convenient.

According to a still further aspect of the present invention, the display means is capable of displaying also an operation condition of the photographic printing device.

With the above construction, the display means functions to display image information concerning an operation condition of the photographic printing device, so as to allow the operator to operate this photographic printing device while observing the image display. And, simultaneously therewith, the operator is allowed to check also the operation condition of the automatic film developing device.

That is, the above construction allows an operator to check the operation condition of the automatic film developing device while continuing an ongoing operation of the photographic printing device by observing the image display on the display means. Hence, the photographic processing system with this feature will be very convenient.

Further and other objects, features and effects of the invention will become more apparent from the following more detailed description of the embodiments of the invention with reference to the accompanying drawings.

DESCRIPTION OF THE PREFERRED EMBODIMENTS

Preferred embodiments of an operation-condition display system for a photographic processing system according to the present invention will be described next with reference to the accompanying drawings.

Figure 1:
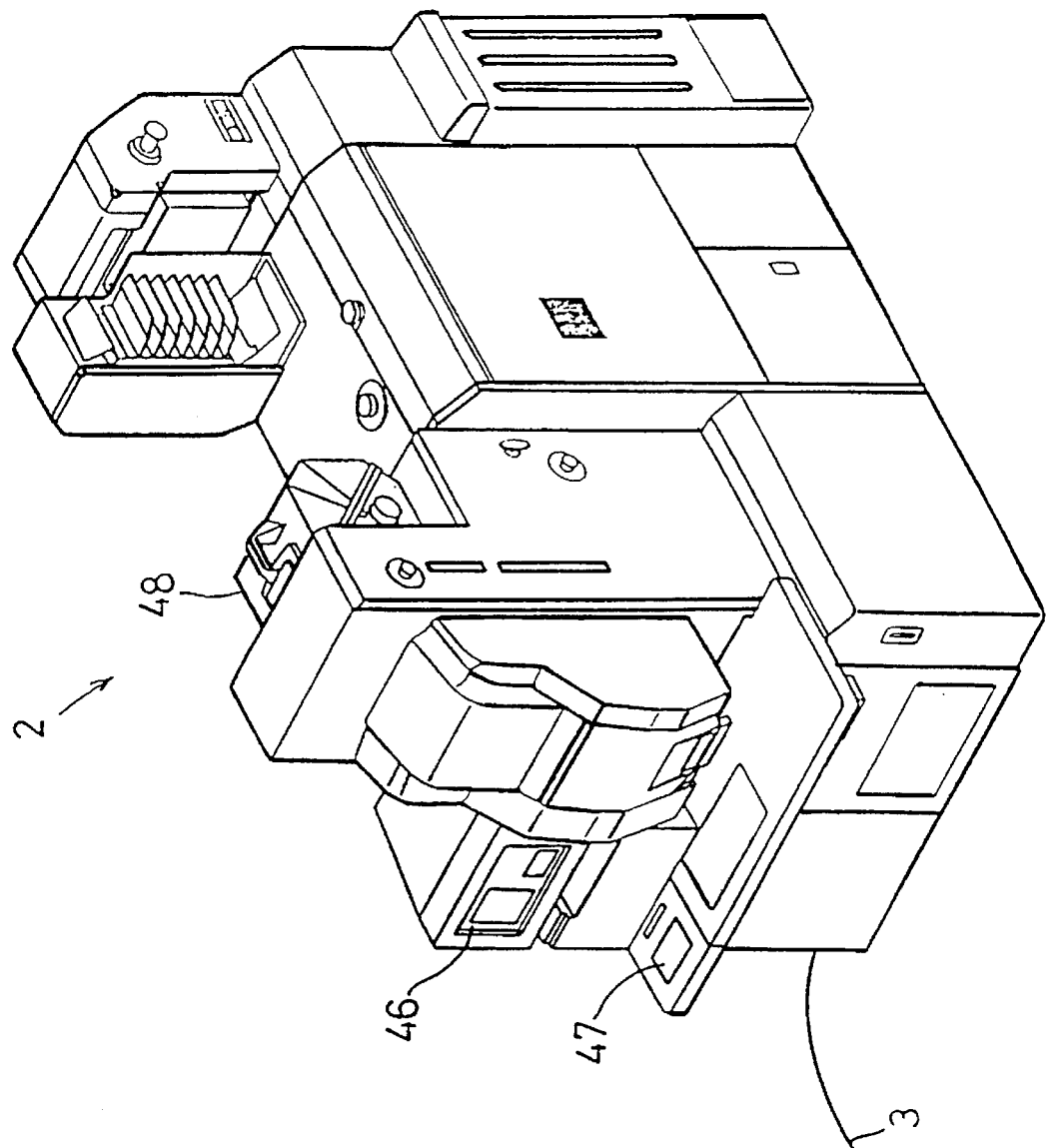
FIG. 1 is a perspective view showing a system according to one preferred embodiment of the present invention.

As shown in FIG. 1, a photographic processing system includes an automatic film developing device 1 and a photographic printing device 2, and these devices 1, 2 are connected to each other via a communication line 3.

Figure 2:
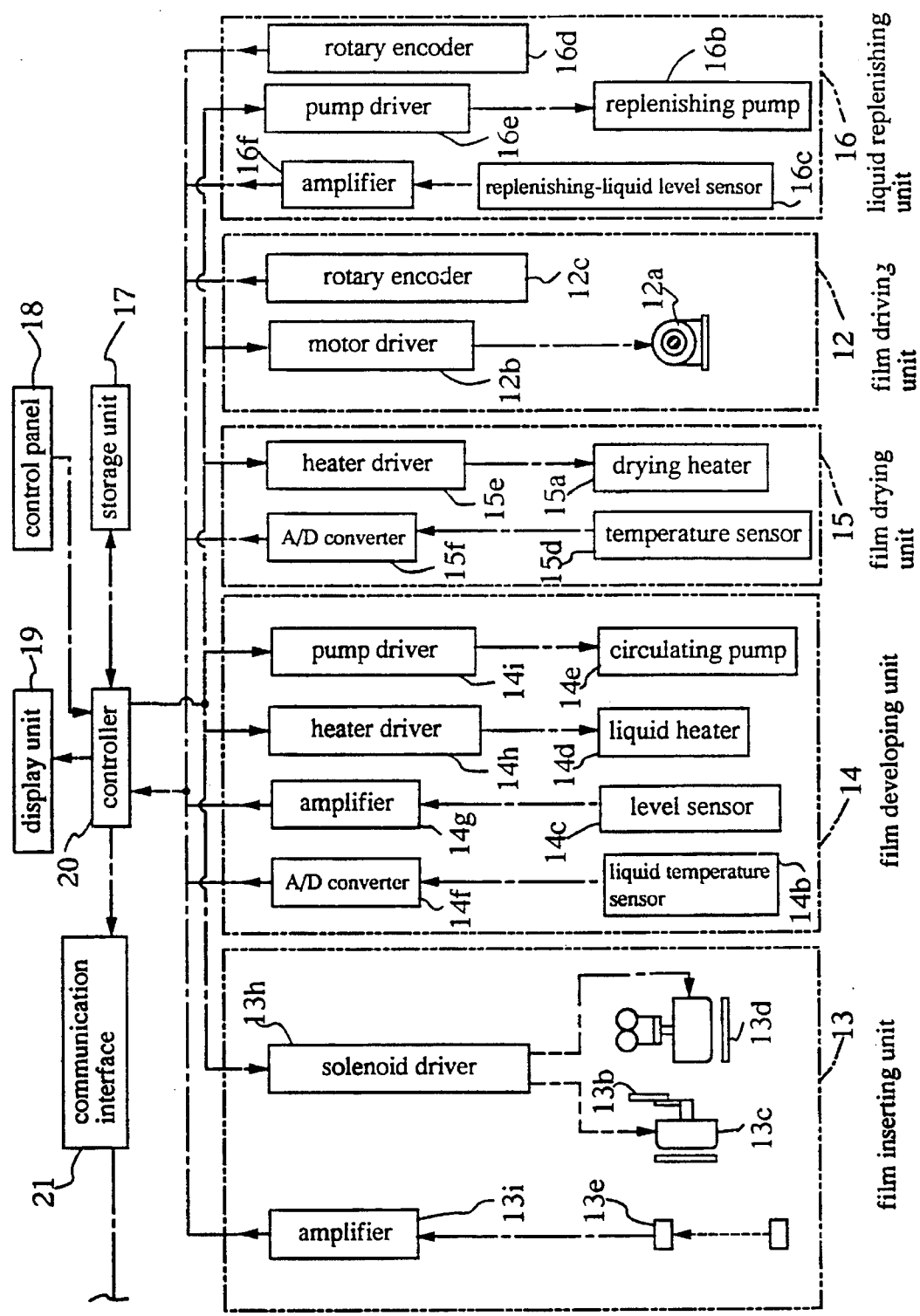
FIG. 2 is a schematic construction view of an automatic film developing device relating to the embodiment of FIG. 1.

The automatic film developing device 1, as shown in FIG. 2, includes a film inserting unit 13 for accommodating a leader 22 (see FIG. 4) which splices film strips 11 to each other, a film developing unit 14 for developing the films 11 transported at the film inserting unit 13, a film drying unit 15 for drying the developed film 11, a processing liquid replenishing unit 16 for replenishing the film developing unit 14 with additional processing liquid, a storage unit 17 for storing e.g. development processing conditions of the film 11, a control panel 18 for inputting e.g. instructions for controlling the automatic film developing device 1, a display unit 19 for displaying information relating to e.g. operation conditions of the automatic film developing device 1, a controller 20 for controlling the various components of the film developing device 1 and a communication interface 21 acting as a first communication means for transmitting the information relating to operation conditions of the automatic film developing device 1 to the photographic printing device 2 via the communication line 3.

Figure 3:
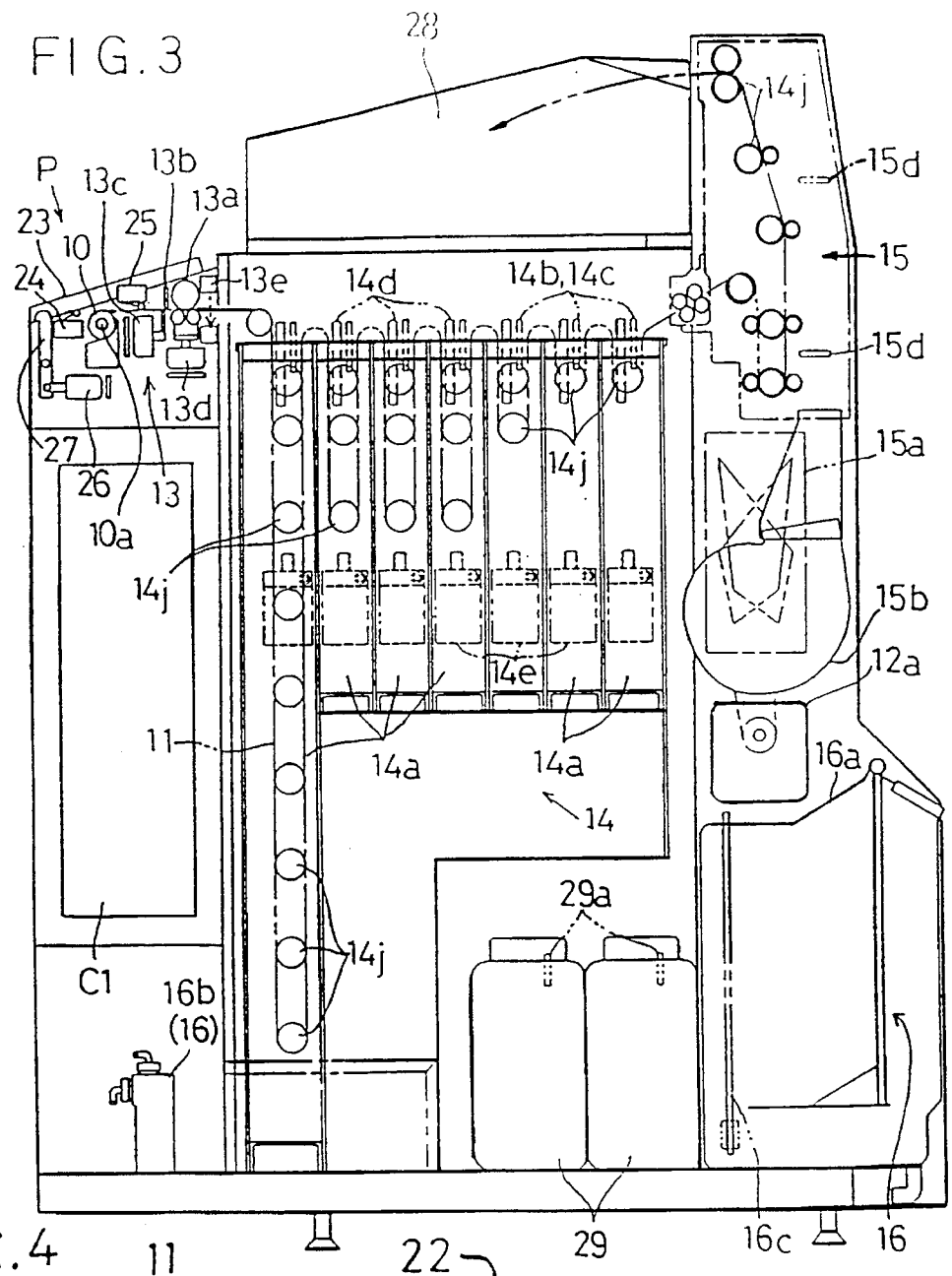
FIG. 3 is a schematic inner construction view of the automatic film developing device relating to the embodiment of FIG. 1.

As shown in FIG. 3, the film developing unit 14 is disposed on a downstream location of a transport passage of the films 11 relative to a film inserting position P and this unit 14 includes seven processing tanks 14a, liquid-temperature sensors 14b for measuring temperature of processing liquid charged within each processing tank 14a, level sensors 14c provided integrally with the liquid-temperature sensors 14b for sensing a liquid level of the processing liquid in each processing tank 14a, liquid heaters 14d acting as liquid heating means for appropriately maintaining the liquid temperature of the processing liquid, circulating pumps 14e acting as circulating means for circulating the processing liquid inside the processing tanks 14a, transport rollers 14j acting as transport means, an A/D converter 14f (not shown in FIG. 3) for effecting A/D conversion of an output signal from each liquid-temperature sensor 14b, an amplifier 14g for amplifying an output signal from each level sensor 14c, a heater driver 14h for driving the liquid heaters 14d, and a pump driver 14i for driving the circulating pump 14e.

The controller 20 controls each liquid heater 14d based on the detection information from the corresponding liquid-temperature sensor 14b, in such a manner that the temperature of the processing liquid may equate with a predetermined temperature stored at the storage unit 17.

As shown in FIG. 3, the film drying unit 15 is disposed at a downstream location in the transport passage of the film 11 relative to the film developing unit 14 and this unit 15 includes a drying heater 15a for drying the film strips 11, a drying fan 15b for feeding warm air to the transport passage of the films 11 in the film drying unit 15, temperature sensors 15d for sensing air temperature inside the film drying unit 15, a heater driver 15e (not shown in FIG. 3) for driving the drying heater 15a, and an A/D converter 15f for effecting A/D conversion of output signals from the temperature sensors 15d.

The controller 20 controls the drying heater 15a based on the detection information from the temperature sensors 15d in such a manner that the air temperature inside the film drying unit 15 may equate with a predetermined air temperature stored at the storage unit 17.

The film inserting unit 13 includes transport rollers 13a acting as transport means, a film cutter 13b for cuttings trailing ends of the films 11 withdrawn from the film cartridges 10, a film-cutting solenoid 13c for sliding one of cutter blades of the film cutter 13b for cutting the films 11, a pressing solenoid 13d for pressing the films 11 against the transport rollers 13a at the film inserting position P, a film size sensor 13e consisting essentially of three photo-interrupters disposed vertically relative to the transport direction of the films 11 and operable to detect a film size, a solenoid driver 13h for driving the film-cutting solenoid 13c and the pressing solenoid 13d, and an amplifier 13i for amplifying a detection signal of the film size sensor 13e. As will be detailed later, the film strips 11 are subjected to a development operation with two rows of film strips 11 being disposed side by side. Therefore, the film-cutting solenoid 13c and the film size sensor 13e are provided for each row of film 11.

The liquid replenishing unit 16 includes a replenishing tank 16a disposed at a lower side of the film drying unit 15, a replenishing pump 16b disposed downwardly of a control unit C1 accommodating the controller 20, the storage unit 17 and the communication interface 21, a replenishing-liquid level sensor 16c for sensing a level of the replenishing processing liquid in the replenishing tank 16a, a rotary encoder 16d (not shown in FIG. 3) for detecting a rotation amount of the replenishing pump 16b, a pump driver 16e for driving the replenishing pump 16b and an amplifier 16f for amplifying an output signal from the replenishing-liquid level sensor 16c.

Based on detection information from the rotary encoder 16d, the controller 20 determines an amount of processing liquid to be replenished from the liquid replenishing unit 16 to the film developing unit 14 and controls the replenishing pump 16b so that the replenished amount of the processing liquid may equate with the predetermined amount.

Incidentally, downwardly of the processing tanks 14a, there are disposed waste liquid tanks 29 for temporarily reserving waste processing liquid. And, inside each waste liquid tank 29, there is provided a waste liquid level sensor 29a for sensing a level of the waste liquid.

Next, the function of the automatic film developing device 1 having the above-described construction will be described briefly.

Figure 4:
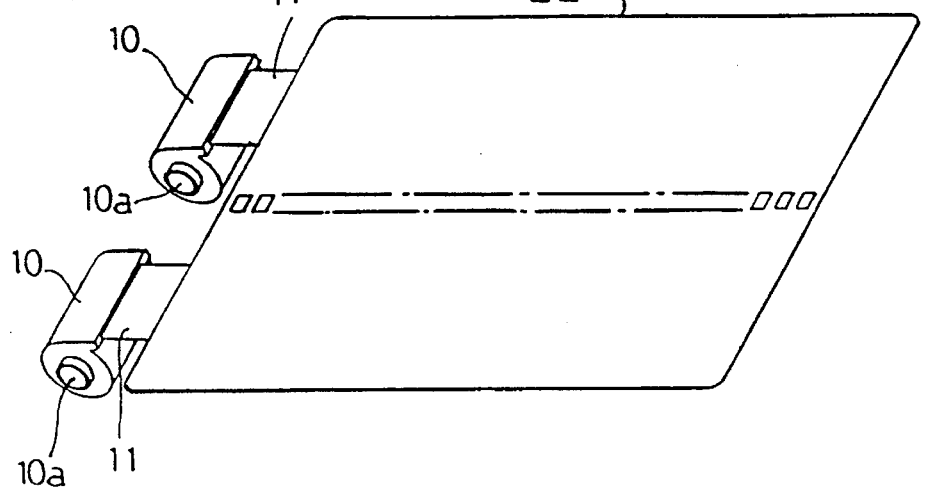
FIG. 4 is a view illustrating connection between film cartridges and a film leader relating to the embodiment of FIG. 1.

As shown in FIG. 4, from the film cartridges 10 accommodating, the exposed film strips 11, the leading ends of the respective film strips 11 are withdrawn to be connected with the leader 22. And, in this condition, the film cartridges 10 are loaded at the film inserting position P of the automatic film developing device 1. Closure of an inserting cover 23 at the film inserting position P is detected by an inserting-cover sensor 24. Then, when a leader sensor 25 detects presence of the leader 22, the automatic film developing device 1 becomes ready for a developing operation of the films 11.

In this condition, when an instruction for initiating the developing operation is inputted from the control panel 18, the controller 20 energizes an inter-locking solenoid 26 provided at the film inserting position P to bring a hooked engaging member 27 into engagement with a portion of the inserting cover 23 thereby to prevent this cover 23 from being opened. Thereafter, the controller 20 energizes the pressing solenoid 13d to bring the leader 22 or the film strips 11 into pressure contact with the transport rollers 13a. Next, a motor 12a shown in FIGS. 2 and 3 is driven to start transporting the films 11.

The films 11 are transported to the processing tanks 14a and are developed during their successive passage through these seven processing tanks 14a. The developed films 11 are dried at the film drying unit 15 and these dried films 11 are discharged into a film receiver 28.

In the course of the above-described process, when the entire film strips 11 have been withdrawn from the film cartridges 10, the controller 20 energizes the film-cutting solenoid 13c to cut the trailing ends of the film strips 11.

While the above-described process is going on, operation conditions of the automatic film developing device 1 detected by the aforementioned sensors provided at the respective components are displayed on the display unit 19 and the information concerning these operation conditions is transmitted by the communication interface 21 to the photographic printing device 2 via the communication line 3.

The above-described operation conditions of the automatic film developing device 1 specifically include a type of the films 11 obtained from the detection information of the film size sensor 13e with each loading of new film cartridges 10 to the film inserting position P, a transported position of the films 11 in the film transport passage obtained from positions of the leading and trailing ends of the films 11 detected by the film size sensor 13e and from an amount of the films 11 fed by the motor 12a, a temperature of the processing liquid detected by the liquid temperature sensor 14b provided at each processing tank 14a, an air temperature of the film drying unit 15 detected by the temperature sensor 15d, and a level of the processing liquid detected by the level sensor 14c provided at each processing tank 14a.

Of the above-described operation conditions, the information concerning the type of the films 11 is transmitted to the photographic printing device 2 with each exchange of the film cartridges 10. The information concerning the transported position of the films 11, the information concerning the liquid temperature of the processing liquid in each processing tank 14a and the information concerning the air temperature of the film drying unit 15 is each transmitted to the photographic printing device 2 when the liquid level in each processing tank 14a becomes lower than the predetermined level.

Next, the constructions of the photographic printing device 2 will be described.

Figure 5:
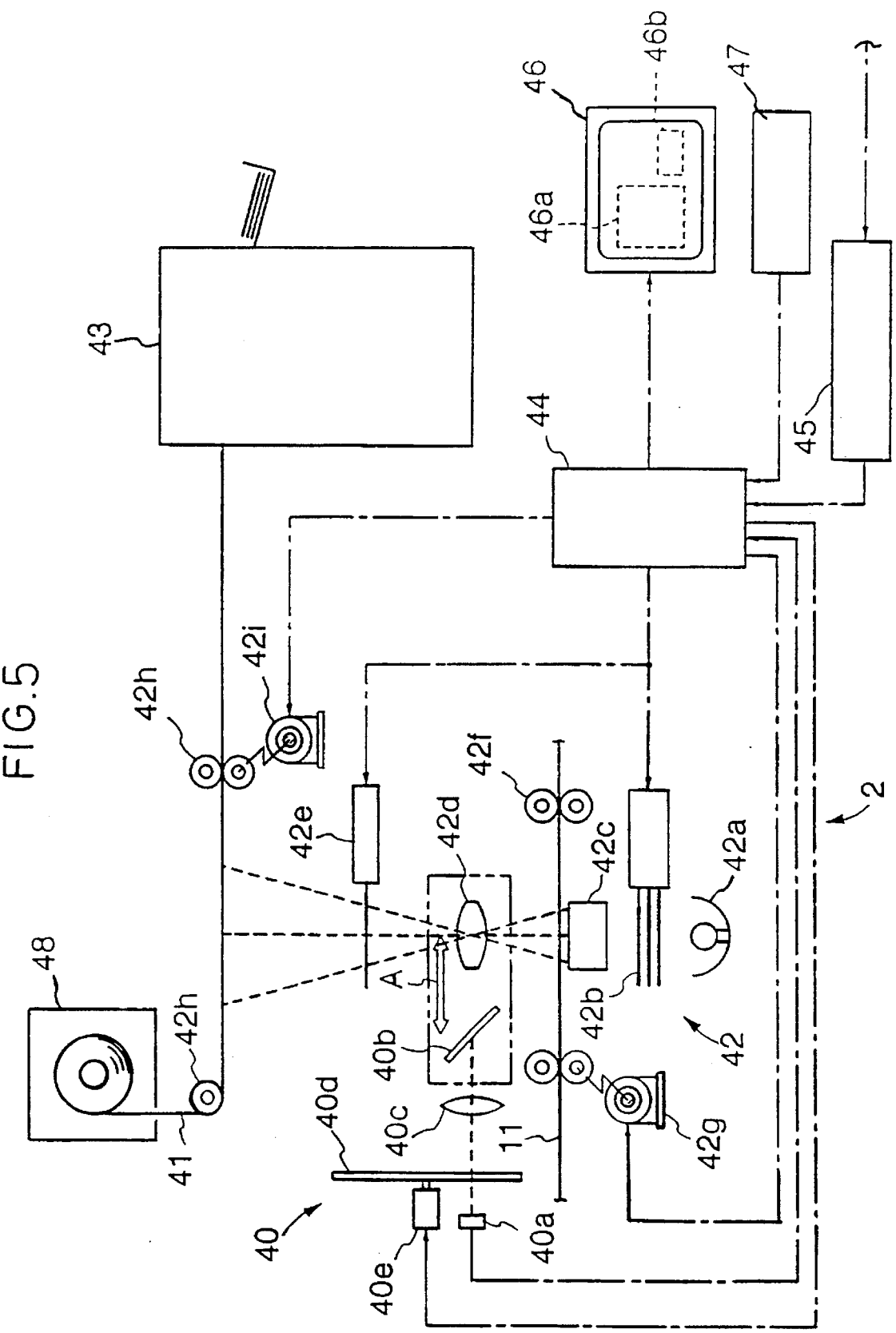
FIG. 5 is a schematic construction view of a photographic printing device relating to the embodiment of FIG. 1.

As shown in FIG. 5, this photographic printing device 2 includes an image reader 40 for reading image information of the developed films 11, a projection-exposure unit 42 for projecting and exposing the image information of the films 11 onto a print paper 41 based on exposure conditions determined based on the image information read by the image reader 40, a developing section 43 for developing the print paper 41 which has been exposed by the projection-exposure unit 41, a controller 44 for controlling the operations of the respective components, a communication interface 45 acting as a second communication means for receiving information transmitted from the automatic film developing device 1 via the communication line 3, a monitor device 46 for displaying various kinds of information and a control panel 47 acting as a control section for inputting various kinds of instructions. Incidentally, in order to allow an operator to operate the control panel 47 while observing the monitor device 46, this monitor device 46 is disposed in the vicinity of the control panel 47, as shown in FIG. 1.

The projection-exposure unit 42 includes a light modulating filter 42b for adjusting color balance of color components of an irradiating beam from an exposure light source 42a, a mirror tunnel 42c for uniformly mixing color components of the light passing through the light modulating filter 42b, a printing lens 42d for imaging the image of the films 11 onto the print paper 41, and a shutter 42e, with these components being aligned on a common optical axis.

A pair of transport rollers 42f for transporting the films 11 are disposed across the optical axis one after another along the transport passage of the films 11. A further pair of transport rollers 42h are disposed across an exposing position of the print paper 41 one after another along the transport passage of the films 11.

A motor 42g and a further motor 42i are provided for driving the transport rollers 42f and the transport rollers 42h respectively.

The image reader 40 includes an image sensor 40a for detecting the image information of the films 11, a mirror 40b for deflecting the transmission light through the films 11 by 90 degrees toward the image sensor 40a, a lens 40c for imaging the image of the films 11 onto the image sensor 41a, a rotary filter 40d for including filters of the three primary color components (i.e. red, green and blue) disposed side by side in the peripheral direction of the filter 40d for separating the image information of the films 11 into the three primary color components, and a motor 40e for rotatably driving the rotary filter 40d. Incidentally, the mirror 40b together with the printing lens 42d of the projection-exposure unit 42, is attached to an unillustrated support member. Then, in operation, by sliding this support member in a direction of an arrow A in FIG. 5, there are selectively provided a state where the mirror 40b is located on the optical axis of the exposure light source 42a and a further state where the printing lens 42d is located on the optical axis of the exposure light source 42a.

Though not shown, the developing unit 43 includes processing tanks of a construction similar to that of the processing tanks 14a of the automatic film developing device 1 shown in FIG. 1. This unit 43 further includes a cutter for cutting the print paper 41 into segments each corresponding to one-frame amount of image of the films 11.

Next, the functions of the photographic printing device 2 having the above-described construction will be described briefly.

The mirror 40b of the image reader 40 is moved onto the optical axis of the exposure light source 42a while retracting the light modulating filter 42b out of said optical axis. In this condition, while the films 11 are being transported by the motor 42g, the image information of the films 11 is color-separated and detected by the image sensor 40a.

The image information detected by the image sensor 40a is inputted to the controller 44 and then the controller 44 obtains exposure conditions for each frame of the films 11.

Thereafter, the controller 44 produces a simulated printing result which will be obtained if the image of the film 11 is projected and exposed on the print paper 41 under said exposure conditions. And, this simulated printing result is displayed on the monitor device 46 as one kind of operation condition information of the photographic printing device 2.

The operator observes this simulated printing result displayed on the monitor device 46. Then, if the operator judges that this simulated printing result is satisfactory, the operator sets said exposure conditions as exposure conditions to be used in an actual projection exposure operation. Conversely, if the operator judges that said simulated printing result is not satisfactory, the operator inputs corrected values of the exposure conditions from the control panel 47, thereby to amend the exposure conditions.

After completion of the above-described exposure condition setting operation, in the projection exposure unit 42 with the printing lens 42d being located on the optical axis, the print paper 41 is serially exposed with the exposed conditions set for each frame while the feeding of of the films 11 by the motor 42g and the feeding of the print paper 41 by the motor 41i are being effected in association with each other.

Thereafter, the exposed print paper 41 is transported to the developing unit 43 to be developed therein and cut into one-frame segments to be discharged from the system.

Simultaneously with the aforementioned display of the simulation image to be used for the exposure condition setting, the monitor device 46 is capable of displaying also information concerning operation conditions of the automatic film developing device 1 received through the communication interface 45.

As shown in FIG. 5, these displays are provided separately at a simulation image display portion 46a for displaying the simulation image and an operation condition displaying portion 46b for displaying the operation conditions of the automatic film developing device 1.

Figures 6, 7:
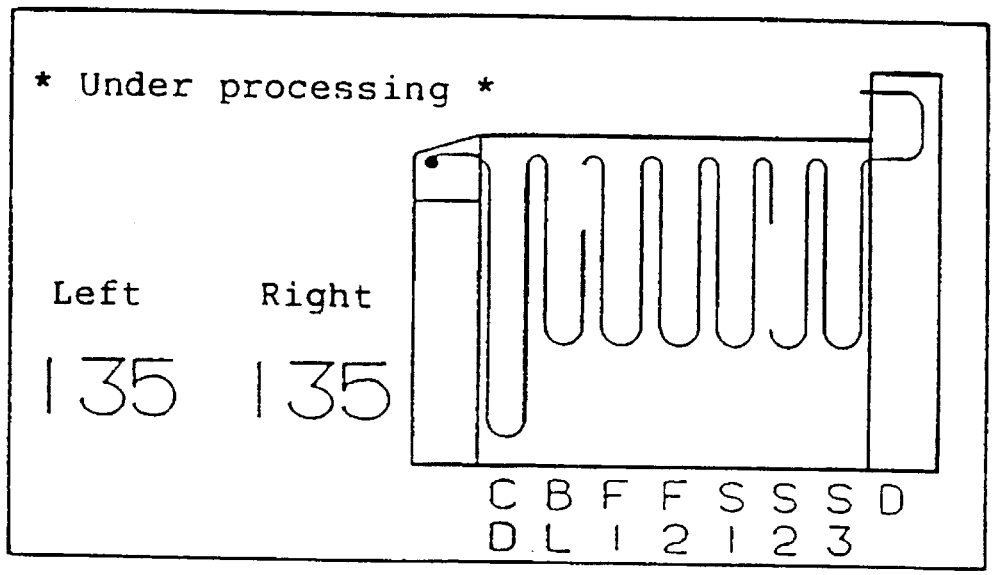
FIG. 6 shows a sample of an operation-condition display of the automatic film developing device relating to the embodiment of FIG. 1.
FIG. 7 shows a further sample of an operation-condition display of the automatic film developing device relating to the embodiment of FIG. 1.
Figure 8:
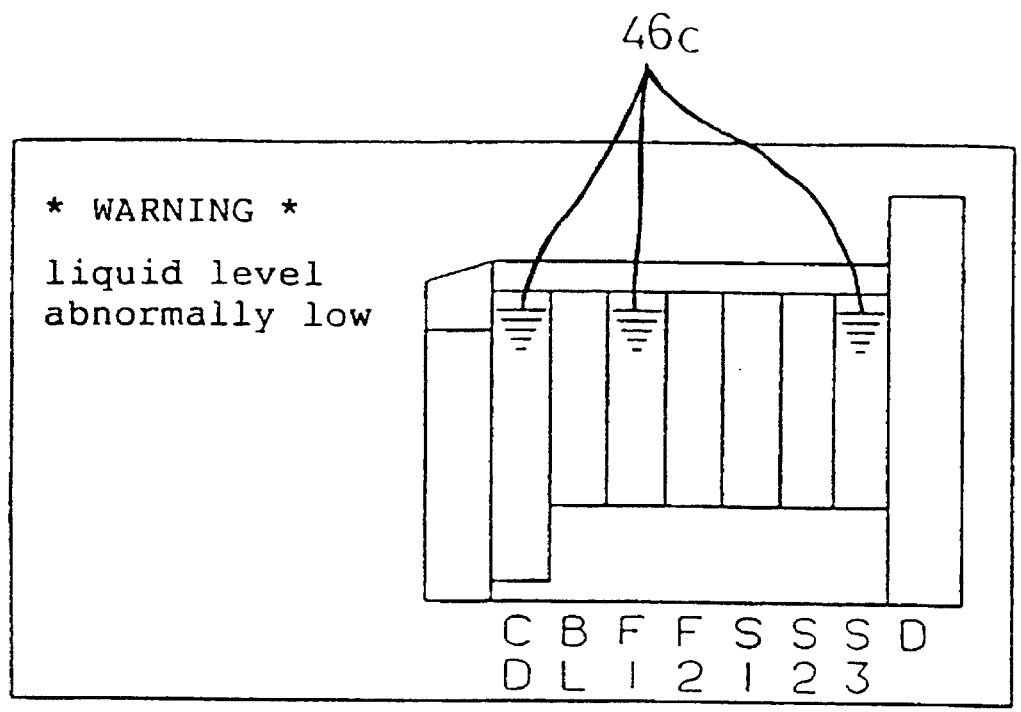
FIG. 8 shows a still further sample of an operation-condition display of the automatic film developing device relating to the embodiment of FIG. 1.

For the display at the operation condition displaying portion 46b of the monitor device 46, there are provided a mode shown in FIG. 6 in which a type of film being developed and a transported position of the films 11 with reference to a schematic diagram of the film developing device 1 are displayed, a further mode shown in FIG. 7 in which a temperature of the processing liquid at each processing tank 14a and an air temperature of the film drying unit 15 are numerically displayed and a still further mode shown in FIG. 8 in which an abnormally lowered level of the processing liquid at the processing tank 14a is indicated by an inverted triangular mark 46c in correspondence with the schematic diagram of the film developing device 1 when the processing liquid level has become lower than the predetermined level.

Figure 9:
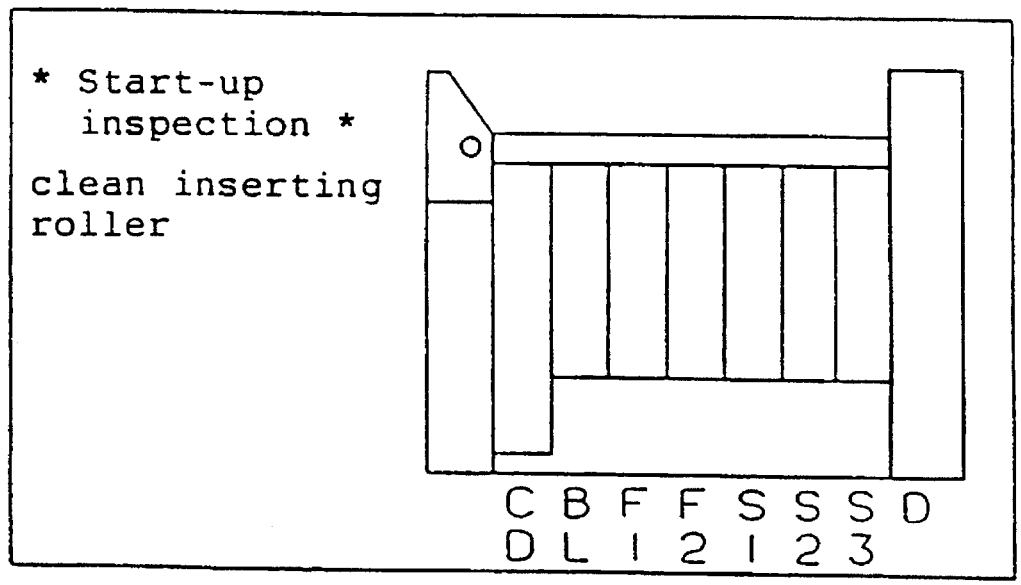
FIG. 9 shows a still further sample of an operation-condition display of the automatic film developing device relating to the embodiment of FIG. 1.

Further, as a further kind of operation condition information of the automatic film developing device, with reception of a signal indicative of power-ON of the automatic film developing device 1, as shown in FIG. 9, there is displayed an operation guide indicating operations to be made on the developing device 1.

Of the above-described display modes, the mode for displaying the transported position of the films 11 and the mode for displaying the temperatures are selectable by an instruction from the control panel 47. Further, the mode for displaying the abnormally lowered processing liquid level is established with priority over the other modes when a signal indicative of the lowered level is received.

Accordingly, the monitor device 46 functions as a display means for displaying the information received through the communication interface 45.

Next, some other embodiments of the invention will be described.

(1) In the foregoing embodiment, the information concerning the operation conditions of the automatic film developing device 1 specifically include the level and temperature of the processing liquid of the processing tank 14a, the air temperature of the film drying unit 15, the type and transported position of the film 11 and the power-ON of this developing device 1. In addition to or in replacement of these kinds, the operation-condition information to be displayed on the monitor device 46 may include the level of the replenishment processing liquid detected by the replenishing liquid level sensor 16c of the replenishing tank 16a and the number of developed film strips 11 which may be detected by using the film size sensor 13e.

(2) In the foregoing embodiment, the communication between the first communication means 21 and the second communication means 45 is effected via the communication line 3. Instead, the communication may be effected in a wireless or optical manner.

(3) In the foregoing embodiment, both the display of the operation conditions of the photographic printing device 2 and the display of the operation conditions of the automatic film developing device 1 are provided on the single monitor device 46. Instead, two monitor devices may be provided for displaying these separately.

(4) In the foregoing embodiment, the display of the operation conditions of the automatic film developing device t is provided on the graphic image monitor device 46. Instead, the present invention may be employed in a photographic printing device having no such monitor device 46 by adapting the temperatures to be displayed on a numerical display LED and/or warning of abnormal lowering in the processing liquid level to be provided by means of a warning lamp.

(5) In the foregoing embodiment, the simulation image is displayed as one kind of operation condition information of the photographic printing device 2. Instead, brightness of the exposure light source 42a of the projection exposure unit 42 and the temperature of the processing liquid of the developing unit 43 may be displayed as the operation condition information.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An operation-condition display system of a photographic processing system comprising:

an automatic film developing device;

a photographic printing device;

first communication means provided in said automatic film developing device for transmitting information concerning an operational condition of the film developing device;

second communication means provided in said photographic printing device for receiving the information from said first communication means; and display means provided in said photographic printing device for displaying the information received by said second communication means.

2. An operation-condition display system as defined in claim 1, wherein said display means is disposed adjacent to a control unit provided to said photographic printing device.

3. An operation-condition display system as defined in claim 1, wherein said display means is capable of graphic image display.

4. An operation-condition display system as defined in claim 3, wherein said display means is capable of displaying information concerning operation conditions of said photographic printing device.

5. An operation-condition display system as defined in claim 1, wherein said first communication means comprises a communication interface for transmitting the information concerning operational conditions of said automatic film developing device to said photographic printing device via a communication line.

6. An operation-condition display system of a photographic processing system comprising:

an automatic film developing device;

a photographic printing device;

first communication means provided in said automatic film developing device for transmitting information concerning an operational condition of the film developing device;

second communication means provided in said photographic printing device for receiving the information from said first communication means;

said first communication means comprising a communication interface for transmitting the information concerning operational conditions of said automatic film developing device to said photographic printing device via a communication line;

display means provided in said photographic printing device for displaying the information received by said second communication means; and said automatic film developing device including a film inserting unit, a film developing unit for developing the film transported at said film inserting unit, a film drying unit for drying the developed film, a processing liquid replenishing unit for replenishing said film developing unit with processing liquid, a storage unit for storing information including development processing conditions of the film, a control panel for inputting information including instructions for controlling said automatic film developing device, a display unit for displaying the information including operational conditions of said automatic film developing device, and a controller for controlling said various components of the film developing device.

7. An operation-condition display system as defined in claim 6, wherein said film developing unit includes a processing tank, a liquid-temperature sensor for measuring temperature of processing liquid charged within said processing tank, a level sensor provided integrally with said liquid-temperature sensor for sensing a liquid level of said processing liquid, liquid heating means for appropriately maintaining the liquid temperature of the processing liquid, circulating means for circulating the processing liquid inside said processing tank, transport means, an A/D converter for effecting A/D conversion of an output signal from said liquid-temperature sensor, amplifying means for amplifying an output signal from said level sensor, driving means for driving said liquid heater, and further driving means for driving said circulating means.

8. An operation-condition display system as defined in claim 6, wherein said film inserting unit includes transport means, cutting means for cutting a trailing end of said film withdrawn entirely from a film cartridge, and driving means for driving said cutting means.

9. An operation-condition display system as defined in claim 1, wherein said second communication means comprises a communication interface for receiving the information transmitted from said automatic film developing device via a communication line.

10. An operation-condition display system as defined in claim 9, wherein said photographic printing device includes an image reader for reading image information of the developed film, a projection-exposure unit for projecting and exposing the image information of the films onto a print paper with exposure conditions determined based on the image information read by said image reader, a developing section for developing said print paper exposed by said projection-exposure unit, and a controller for controlling the operations of said respective components of the photographic printing device.

11. An operation-condition display system of a photographic processing system, comprising:

an automatic film developing device including,
      a film inserting unit for feeding an exposed film,
      a film developing unit for developing the film fed from the film inserting unit, and
      a film drying unit for drying the developed film,
   transporting means for defining a transport passage along which the film is transported from the film inserting unit through the film developing unit to the film drying unit, said transporting means having,
      a transportation drive motor, and
      a film size sensor for detecting a leading end and a trailing end of the film fed from the film inserting unit,
   a controller connected with the transportation drive motor and the film size sensor, said controller determining a transported position of the film in said transport passage based on a film leading-end detection signal and a film trailing-end detection signal from the film size sensor and on a control signal to the transportation drive motor;

first communication means for transmitting, to the outside, information concerning the transported position of the film determined by said controller; and a photographic printing device including,
second communication means for receiving said information from the first communication means, and
display means for displaying said information received by the second communication means.

12. A film developing device capable for transmitting operation-condition information, which comprises:

a film inserting unit for feeding an exposed film;

a film developing unit for developing the film fed from the film inserting unit;

a film drying unit for drying the developed film;

transporting means for defining a transport passage along which the film is transported from the film inserting unit through the film developing unit to the film drying unit, said transporting means having,
a transportation drive motor, and
a film size sensor for detecting a leading end and a trailing end of the film fed from the film inserting unit, a controller connected with the transportation drive motor and the film size sensor, said controller determining a transported position of the film in said transport passage based on a film leading-end detection signal and a film trailing-end detection signal from the film size sensor and on a control signal to the transportation drive motor; and a communication interface for transmitting, to the outside, information concerning the transported position of the film determined by said controller.

13. A film developing device according to claim 12, wherein said film size sensor is operable to detect a film size and also to output a film size signal to said controller, and said controller determines the size of the film under transportation and outputs information concerning the determined film size to the outside through said communication interface.

* * * * *